US011737057B2

(12) United States Patent
Ryu et al.

(10) Patent No.: US 11,737,057 B2
(45) Date of Patent: Aug. 22, 2023

(54) TECHNIQUES FOR UPDATING PREEMPTED OR CANCELLED RESOURCES IN WIRELESS COMMUNICATIONS

(71) Applicant: QUALCOMM Incorporated, San Diego, CA (US)

(72) Inventors: Jung Ho Ryu, Fort Lee, NJ (US); Sony Akkarakaran, Poway, CA (US); Tao Luo, San Diego, CA (US); Junyi Li, Chester, NJ (US); Ling Ding, Chester, NJ (US); Jelena Damnjanovic, Del Mar, CA (US); Kapil Gulati, Belle Mead, NJ (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 21 days.

(21) Appl. No.: 17/186,681

(22) Filed: Feb. 26, 2021

(65) Prior Publication Data

US 2021/0274470 A1    Sep. 2, 2021

Related U.S. Application Data

(60) Provisional application No. 62/984,188, filed on Mar. 2, 2020.

(51) Int. Cl.
*H04W 72/02* (2009.01)
*H04W 72/1263* (2023.01)
(Continued)

(52) U.S. Cl.
CPC ....... *H04W 72/02* (2013.01); *H04W 72/1263* (2013.01); *H04W 72/535* (2023.01); *H04W 76/30* (2018.02)

(58) Field of Classification Search
CPC ......... H04W 72/1257; H04W 72/1263; H04W 72/14; H04W 72/1289; H04W 72/1242;
(Continued)

(56) References Cited

U.S. PATENT DOCUMENTS

2016/0302250 A1* 10/2016 Sheng .................... H04W 76/14
2017/0041902 A1*  2/2017 Sheng .................... H04W 72/02
(Continued)

FOREIGN PATENT DOCUMENTS

EP            3826406 A1    5/2021
WO      2018175420 A1    9/2018
(Continued)

OTHER PUBLICATIONS

Intel Corporation: "Enhancements to Inter-UE Multiplexing", 3GPP Draft, R1-1912218, 3GPP TSG-RAN WG1 #99, 3rd Generation Partnership Project (3GPP), France, vol. RAN WG1, No. Reno, USA, Nov. 18, 2019-Nov. 22, 2019, Nov. 9, 2019 (Nov. 9, 2019), XP051823295, pp. 1-6, R1-1912218 Inter—UL inter-UE mux_v2. doc, Chapter 2.2 DCI Contents and RUR Configuration, Chapter 2.3 Benefits of UE-Specific DCI Design.
(Continued)

*Primary Examiner* — Ricardo H Castaneyra
(74) *Attorney, Agent, or Firm* — Arent Fox, LLP

(57) ABSTRACT

Aspects described herein relate to preempting or cancelling sidelink or uplink resources of one or more devices to allow sidelink or uplink transmissions of one or more other devices, and/or determining subsequent resources for transmitting communications based on the preempted or cancelled sidelink or uplink resources. In an aspect, an indication to preempt receiving communications or cancel transmitting communications over scheduled resources can be received, and based at least in part on the indication, subsequent resources over which to receive or transmit the (Continued)

communications can be determined. The communications can be received or transmitted in the subsequent resources.

16 Claims, 9 Drawing Sheets

(51) Int. Cl.
*H04W 76/30* (2018.01)
*H04W 72/50* (2023.01)

(58) Field of Classification Search
CPC ..... H04W 72/02; H04W 76/30; H04W 76/36; H04W 76/14; H04W 92/18; H04W 72/535; H04W 72/23; H04W 72/569
See application file for complete search history.

(56) References Cited

U.S. PATENT DOCUMENTS

| | | | |
|---|---|---|---|
| 2019/0239112 A1* | 8/2019 | Rao | H04W 4/70 |
| 2019/0254067 A1 | 8/2019 | Al-Imari et al. | |
| 2020/0045674 A1* | 2/2020 | Tseng | H04W 76/19 |
| 2020/0344747 A1 | 10/2020 | Park | |
| 2021/0168783 A1 | 6/2021 | Islam et al. | |
| 2021/0307032 A1* | 9/2021 | Osawa | H04W 72/1242 |
| 2021/0360686 A1 | 11/2021 | Taherzadeh Boroujeni et al. | |
| 2022/0217736 A1 | 7/2022 | Taherzadeh Boroujeni et al. | |

FOREIGN PATENT DOCUMENTS

| | | | |
|---|---|---|---|
| WO | 2020017012 A1 | 1/2020 | |
| WO | 2020033660 A1 | 2/2020 | |
| WO | WO-2020197645 A1 * | 10/2020 | ........ H04W 72/0406 |

OTHER PUBLICATIONS

International Search Report and Written Opinion—PCT/US2021/020216—ISA/EPO—dated Jun. 17, 2021.
Vivo: "UL Inter-UE Tx Prioritization for URLLC", 3GPP Draft, 3GPP TSG RAN WG1 #97, R1-1906150_ UL Inter UE TX Prioritization for URLLC, 3rd Generation Partnership Project (3GPP), Mobile Competence Centre, 650, Route Des Lucioles, F-06921, Sophia-Antipolis Cedex, France, vol. RAN WG1, No. Reno, USA, May 13, 2019-May 17, 2019, May 1, 2019 (May 1, 2019), XP051708191, 13 Pages, pp. 1-9, the whole document.

* cited by examiner

UE1's UL got cancelled by CI.
UE1 can use the next UL Tx
opportunity indicated by CI UE1's DL got preempted by PI.
UE1 can use the next DL Rx
opportunity indicated by PI

TECHNIQUES FOR UPDATING PREEMPTED OR CANCELLED RESOURCES IN WIRELESS COMMUNICATIONS

CLAIM OF PRIORITY UNDER 35 U.S.C. § 119

The present application for patent claims priority to Provisional Patent Application No. 62/984,188, entitled "TECHNIQUES FOR UPDATING PREEMPTED OR CANCELLED RESOURCES IN WIRELESS COMMUNICATIONS" filed Mar. 2, 2020, which is assigned to the assignee hereof and hereby expressly incorporated by reference herein for all purposes.

BACKGROUND

Aspects of the present disclosure relate generally to wireless communication systems, and more particularly, to scheduling resources in wireless communications.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In wireless communication technologies such as 5G NR, devices, such as user equipment (UEs), can communicate with a wireless network via base stations or gNB over an access link. A gNB can preempt uplink resources scheduled for a first UE to transmit communications in order to allow a second UE to transmit uplink communications over the resources, or can cancel downlink resources scheduled for a first UE to receive downlink communications in order to allow a second UE to receive downlink communications over the resources. In another example, devices can also communicate with one another directly over a sidelink.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for wireless communication is provided. The method includes receiving an indication to preempt receiving communications or cancel transmitting communications over scheduled resources, determining, based at least in part on the indication, subsequent resources over which to receive or transmit the communications, and receiving or transmitting the communications in the subsequent resources.

In another example, a method for wireless communication is provided. The method includes selecting, from a pool of resources, a set of sidelink resources over which to transmit sidelink communications, and indicating, to a base station, to transmit high priority sidelink communications over the set of sidelink resources to cause the base station to preempt or cancel sidelink communications of other devices over the set of sidelink resource.

In another example, a method for wireless communication is provided. The method includes scheduling a device with resources for receiving or transmitting communications, determining to preempt the resources for receiving communications or cancel the resources for transmitting communications, and transmitting, based on determining to preempt or cancel the resources, an indication to preempt receiving communications or cancel transmitting communications over the resources, wherein the indication indicates subsequent resources over which to receive or transmit the communications.

In a further example, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

In an aspect, an apparatus for wireless communication is provided that includes a transceiver, a memory configured to store instructions, and one or more processors communicatively coupled with the memory and the transceiver. The one or more processors are configured to receive an indication to preempt receiving communications or cancel transmitting communications over scheduled resources, determine, based at least in part on the indication, subsequent resources over which to receive or transmit the communications, and receive or transmit the communications in the subsequent resources.

In an aspect, an apparatus for wireless communication is provided that includes a transceiver, a memory configured to store instructions, and one or more processors communicatively coupled with the memory and the transceiver. The one or more processors are configured to select, from a pool of resources, a set of sidelink resources over which to transmit sidelink communications, and indicate, to a base station, to transmit high priority sidelink communications over the set of sidelink resources to cause the base station to preempt or cancel sidelink communications of other devices over the set of sidelink resources.

In an aspect, an apparatus for wireless communication is provided that includes a transceiver, a memory configured to store instructions, and one or more processors communicatively coupled with the memory and the transceiver. The one or more processors are configured to schedule a device with resources for receiving or transmitting communications, determine to preempt the resources for receiving communications or cancel the resources for transmitting communications, and transmit, based on determining to preempt or cancel the resources, an indication to preempt receiving communications or cancel transmitting communications over the resources, wherein the indication indicates subsequent resources over which to receive or transmit the communications.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
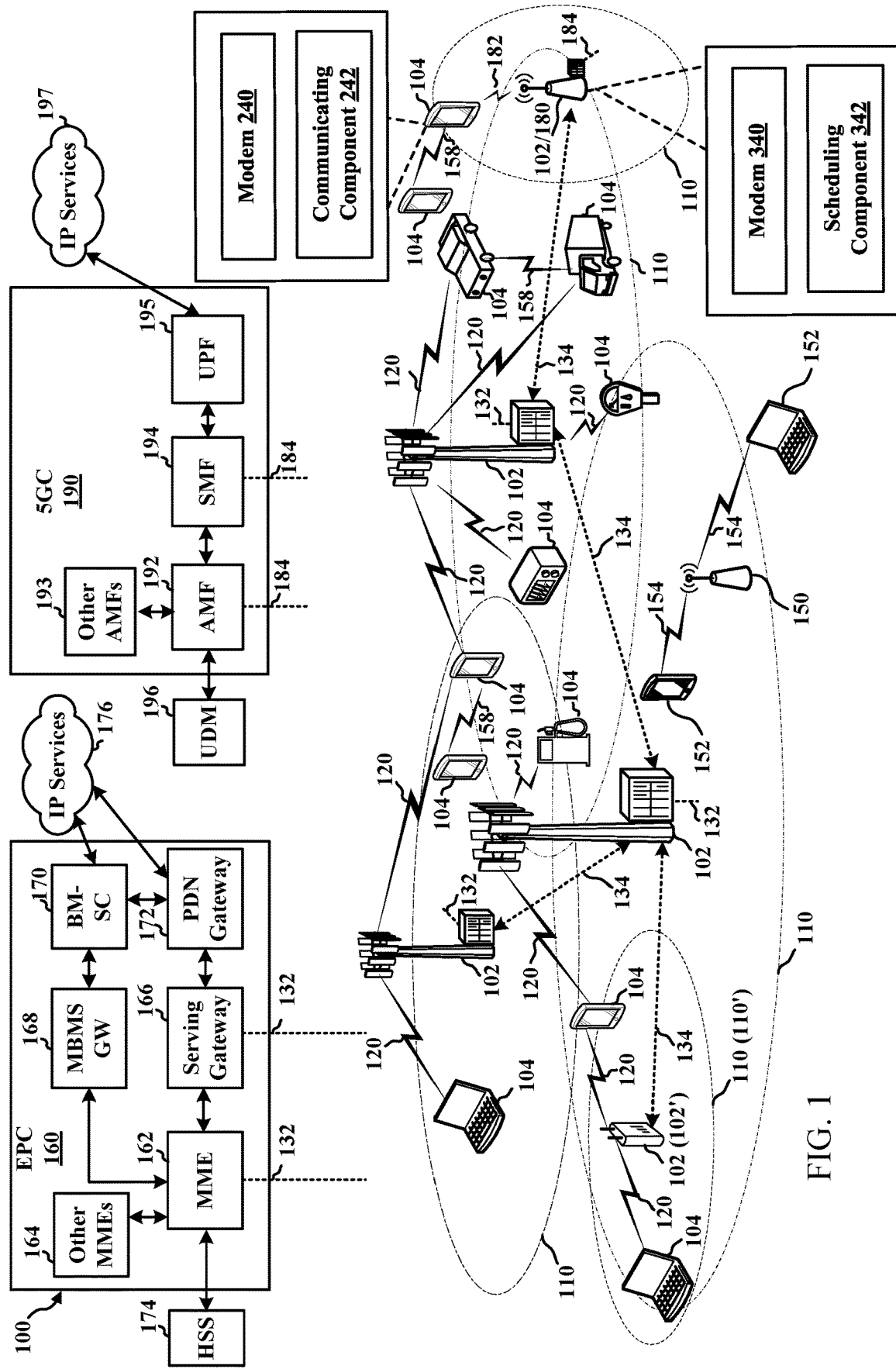
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to determining resources for a device to use in communicating where originally scheduled resources are preempted or cancelled in favor of communications of another device. Resources, as described herein, may include time and/or frequency resources that are scheduled for the device to communicate in a wireless network, such as one or more orthogonal frequency division multiplexing (OFDM) symbols, single carrier frequency division multiplexing (SC-FDM) symbols, one or more slots of one or more symbols, a partial symbols, etc., one or more portions of frequency within the symbol(s), such as one or more subcarriers, resource elements, resource blocks, channel numbers, bandwidth parts, and/or the like. For example, a device having preempted or cancelled resources can determine subsequent resources, which may be at a different time and/or at a different frequency, for communicating based on a received preemption indication or cancellation indication. For example, the device may implicitly determine the subsequent resources based on the received preemption or cancellation indication (e.g., as resources indicated in or determined from a configuration, as resources that are a time and/or frequency offset from the preempted or cancelled resources, etc.). In another example, the preemption and/or cancellation indication may specify the subsequent resources to be used for the communications by the device.

In an example, the devices can use different types of communications, such as ultra-reliable-low latency communications (URLLC), enhanced mobile broadband (eMBB), etc., which may have different associated priorities, quality-of-service (QoS) requirements, and/or the like. In addition, in time division duplexing (TDD), a gNB can schedule uplink (UL) slots, or other collections of symbols, for one or more of UL transmissions from the UE to gNB or sidelink transmissions from UE to another UE (e.g., in mode 1 operation, where gNB schedules sidelink (SL) activities). In the context of URLLC and SL (and TDD), there are multiple scenarios where some communications may be preempted or cancelled to allow other communications. For example, higher priority UL traffic, such as UL URLLC traffic, may arrive that is to be transmitted in resources that have been scheduled for lower priority UL traffic, such as UL eMBB traffic or SL traffic. In another example, sidelink URLLC traffic may arrive that is to be transmitted in resources scheduled for UL traffic. In another example, higher priority sidelink traffic, such as sidelink URLLC traffic, may arrive that is to be transmitted in resources that have been scheduled for normal non-urgent sidelink traffic, such as sidelink eMBB traffic.

Aspects described herein relate to the preemption indication or cancellation indication serving as an implicit or explicit update of grant parameters to determine subsequent resources for communications. In an example, where resources are preempted or cancelled, the indication can serve as an implicit or explicit indication of additional (e.g., increased) resources in a subsequent time period to make up for the preemption or cancellation. In this regard, the devices whose resources are preempted or cancelled can have subsequent resources for communicating so communications originally scheduled over preempted or cancelled resources are not wasted. In addition, by including the updated grant information implicitly or explicitly in the preemption or cancelation indication, delay associated with granting resources can be reduced by not having to wait for a subsequent grant of resources.

The described features will be presented in more detail below with reference to FIGS. 1-9.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for determining subsequent resources for communicating with a base station 102 or another UE 104 when originally scheduled resources are preempted or cancelled, in accordance with aspects described herein, and some nodes may have a modem 340 and scheduling component 342 for indicating subsequent resources for communicating with the base station 102 or another UE 104 when originally scheduled resources are preempted or cancelled, in accordance with aspects described herein. Though a UE 104 is shown as having the modem 240 and communicating component 242 and a base station 102/gNB 180 is shown as having the modem 340 and scheduling component 342, this is one illustrative example, and substantially any node or type of node may include a modem 240 and communicating component 242 and/or a modem 340 and scheduling component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, scheduling component 342 of a base station 102 can schedule a UE 104 for communicating at least one of with the base station 102 in access link communications, or with another UE 104 in sidelink communications, by indicating a set of time and/or frequency resources over which the UE 104 can communicate (e.g., transmit or receive). In some scenarios, the base station 102 can preempt scheduled downlink resources for the UE 104 in favor of transmitting communications to another UE, or can cancel uplink resources for the UE 104 in favor of scheduling resources for another UE. In accordance with aspects described herein, communicating component 242 can receive an indication of scheduled resources for the UE 104. Communicating component 242 can then receive one or more of a preemption indicator (PI) indicating preemption of the scheduled resources (e.g., preempting scheduled downlink resources) or a cancellation indicator (CI) cancelling the scheduled resources (e.g., cancelling scheduled uplink or sidelink resources). Communicating component 242, for example, can then determine, e.g., as an implicit or explicit indication based on the PI or CI, subsequent resources for communicating with the base station 102 or other UE.

Figure 2:
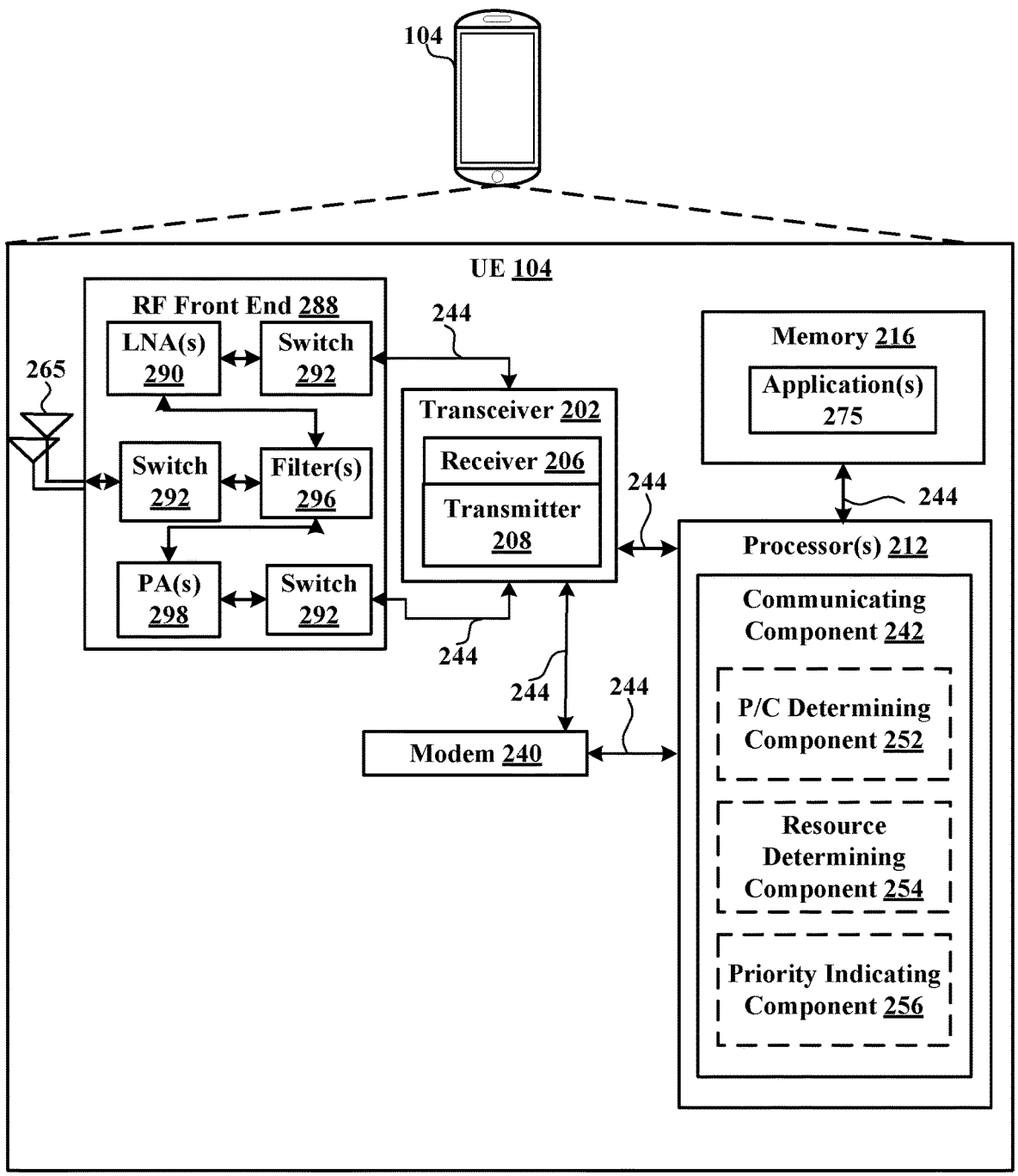
FIG. 2 is a block diagram illustrating an example of a UE, in accordance with various aspects of the present disclosure.
Figure 3:
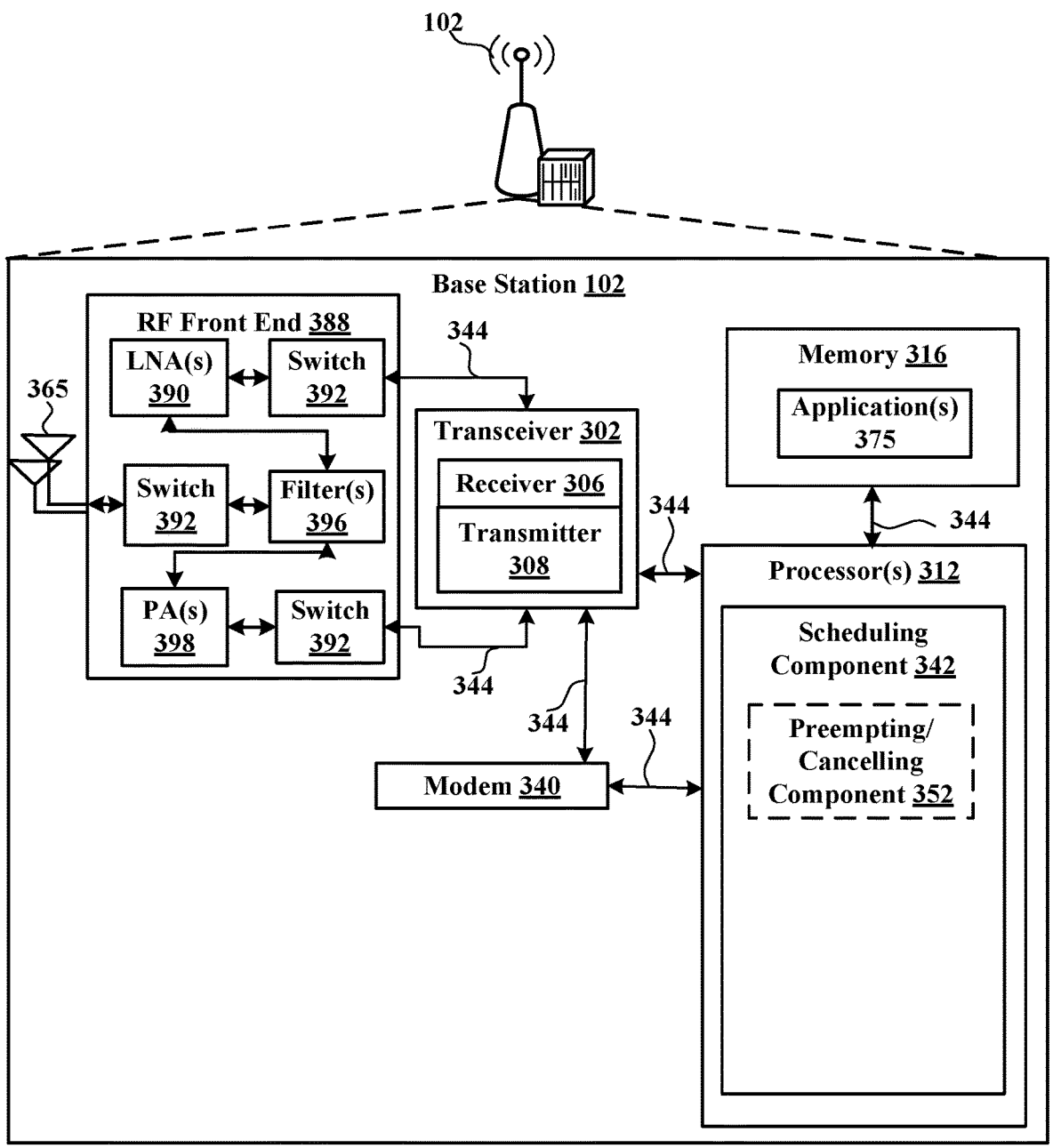
FIG. 3 is a block diagram illustrating an example of a base station, in accordance with various aspects of the present disclosure.
Figure 4:
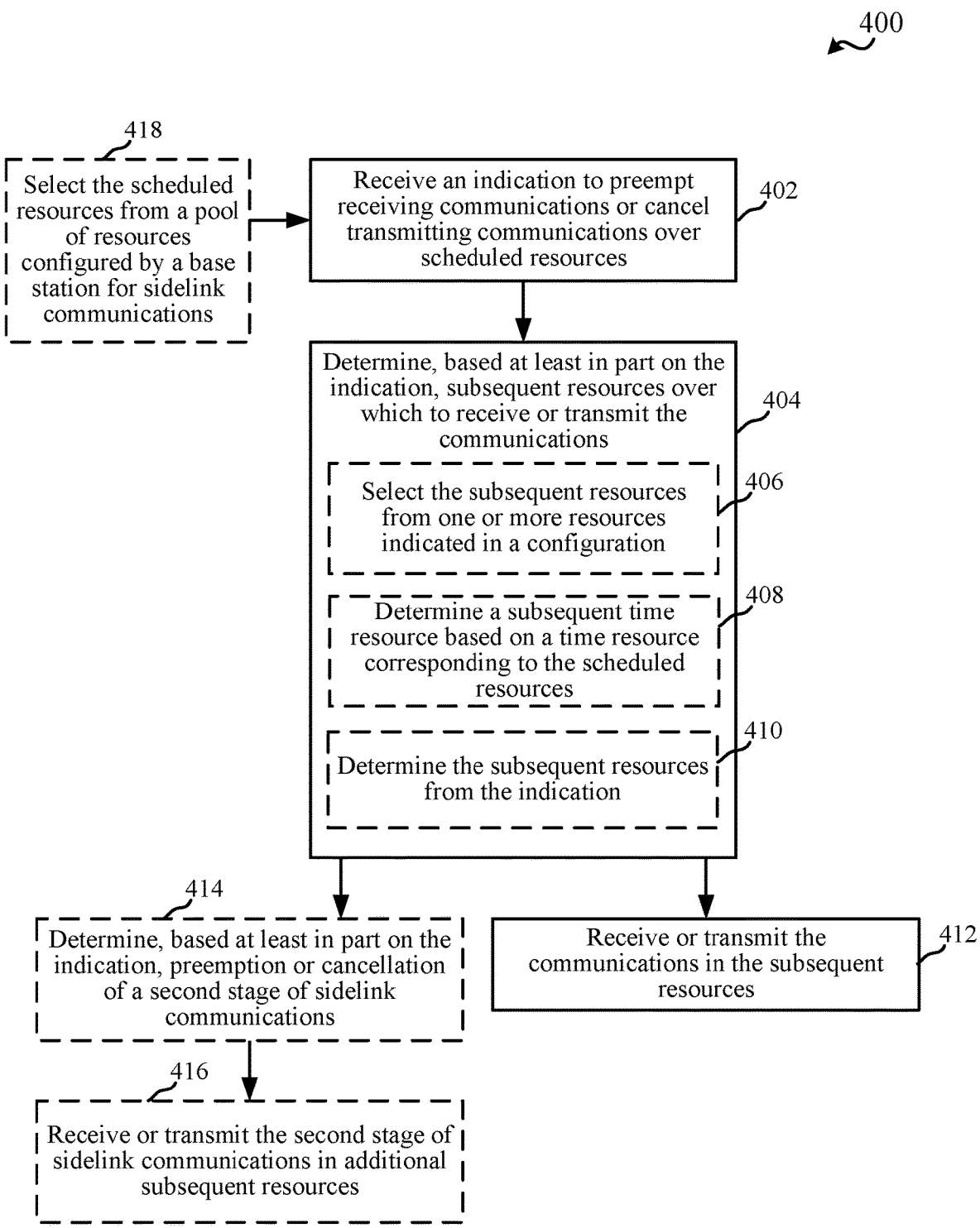
FIG. 4 is a flow chart illustrating an example of a method for determining subsequent resources for preempted or cancelled resources, in accordance with various aspects of the present disclosure.
Figure 5:
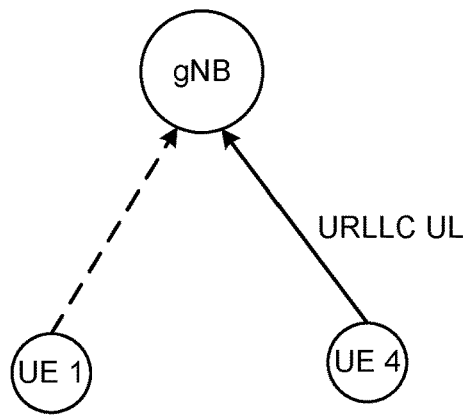
FIG. 5 illustrates examples of systems with different scenarios for preempting or cancelling uplink communications, in accordance with various aspects of the present disclosure.
Figure 5:
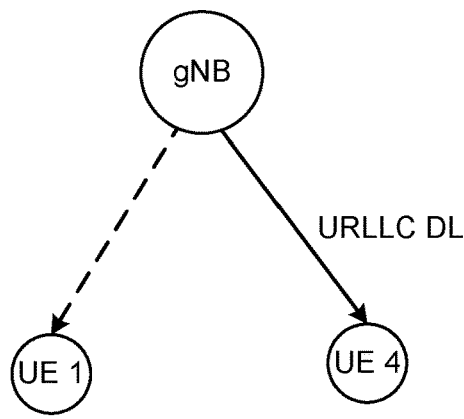
Figure 6:
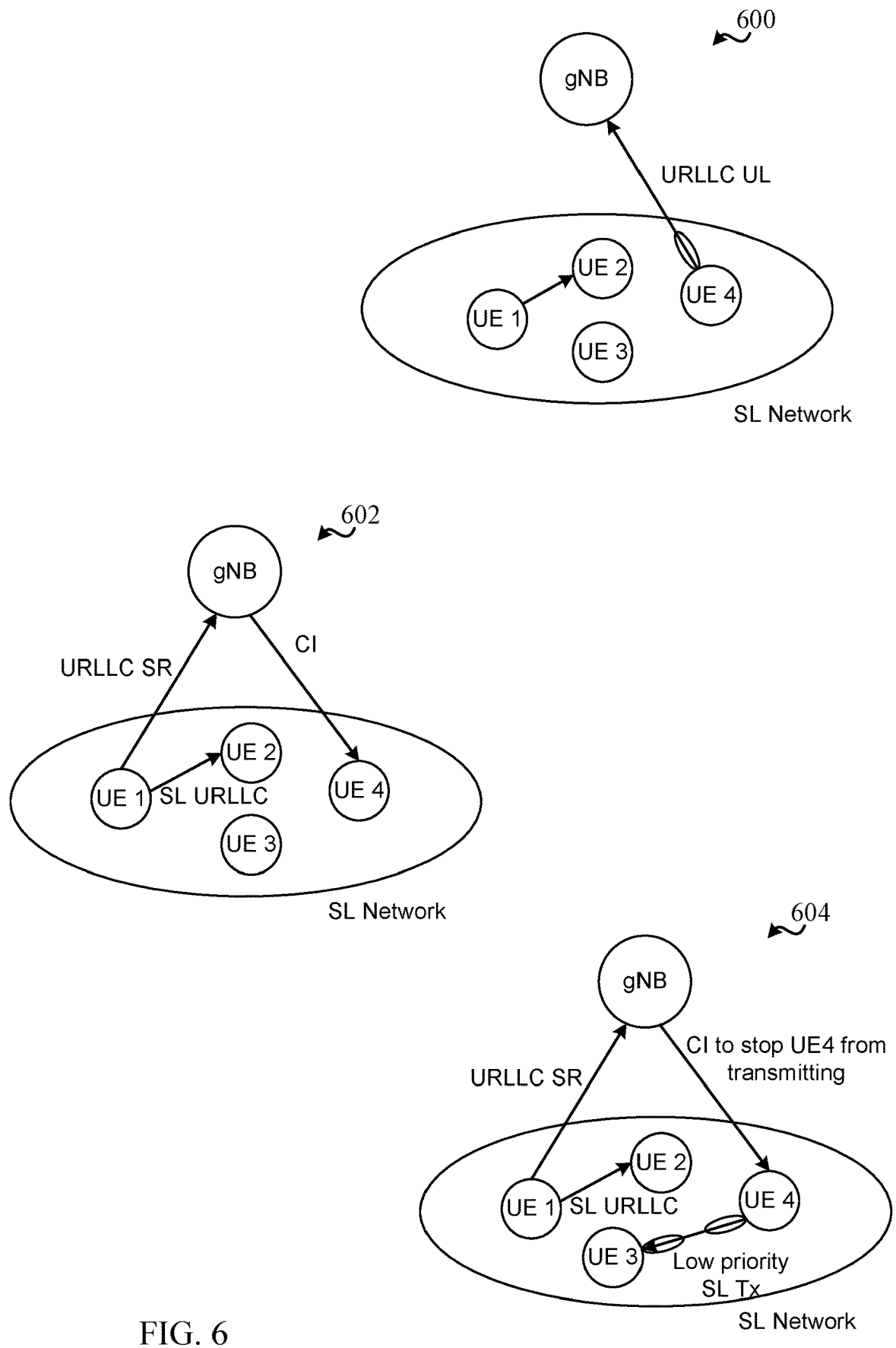
FIG. 6 illustrates examples of systems with different scenarios for preempting or cancelling sidelink communications, in accordance with various aspects of the present disclosure.
Figure 7:
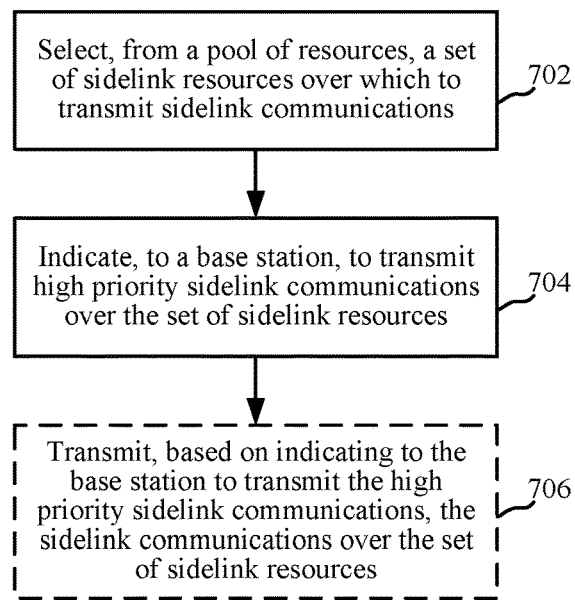
FIG. 7 is a flow chart illustrating an example of a method for indicating high priority transmissions, in accordance with various aspects of the present disclosure.
Figure 8:
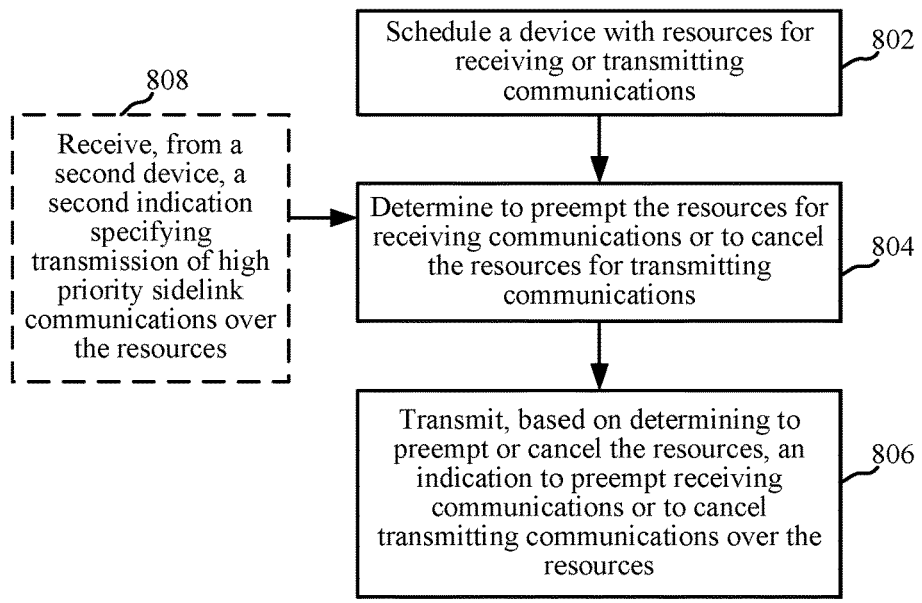
FIG. 8 is a flow chart illustrating an example of a method for indicating subsequent resources for preempted or cancelled resources, in accordance with various aspects of the present disclosure.

Turning now to FIGS. 2-9, aspects are depicted with reference to one or more components and one or more methods that may perform the actions or operations described herein, where aspects in dashed line may be optional. Although the operations described below in FIGS. 4, 7, and 8 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for determining subsequent resources for communicating with a base station or another UE when originally scheduled resources are preempted or cancelled, as described further herein.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a preemption/cancellation (P/C) determining component 252 for determining preemption or cancellation of scheduled resources, a resource determining component 254 for determining subsequent resources for communicating when originally scheduled resources are preempted or cancelled, and/or a priority indicating component 256 for indicating a high priority sidelink communications over selected resources, as described further herein.

In an aspect, the processor(s) 212 may correspond to one or more of the processors described in connection with the UE in FIG. 9. Similarly, the memory 216 may correspond to the memory described in connection with the UE in FIG. 9.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and scheduling component 342 for indicating subsequent resources for communicating with a base station or another UE when originally scheduled resources are preempted or cancelled, as described further herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, scheduling component 342 can optionally include a preempting/cancelling component 352 for preempting or cancelling resources scheduled for a UE 104 to communicate over an access link with a base station or over a sidelink with another UE, as described further herein.

In an aspect, the processor(s) 312 may correspond to one or more of the processors described in connection with the base station in FIG. 9. Similarly, the memory 316 may correspond to the memory described in connection with the base station in FIG. 9.

FIG. 4 illustrates a flow chart of an example of a method 400 for determining subsequent resources for communicating where originally scheduled resources are preempted or cancelled. In an example, a UE 104 can perform the functions described in method 400 using one or more of the components described in FIGS. 1 and 2.

In method 400, at Block 402, an indication to preempt receiving communications or cancel transmitting communications can be received over scheduled resources. In an aspect, P/C determining component 252, e.g., in conjunction with processor(s) 212, memory 216, transceiver 202, communicating component 242, etc., can receive the indication to preempt receiving communications or cancel transmitting communications over scheduled resources. For example, communicating component 242 can have received a scheduling of resources (e.g., a resource grant or other indication of scheduled resources) from the base station 102 granting downlink resources for receiving communications from the base station 102 over an access link or granting uplink resources for transmitting communications to the base station 102 over the access link. In another example, communicating component 242 can have received a scheduling of resources (e.g., a resource grant or other indication of scheduled resources) from the base station 102 granting sidelink resources for transmitting communications to, or receiving communications from, another UE over a sidelink.

In an example, the scheduled resources can include a portion of frequency (e.g., one or more subcarriers) over a portion of time (e.g., one or more OFDM symbols, SC-FDM symbols, etc., one or more slots of multiple symbols, and/or the like). In one example, the first resources can correspond to one or more resource blocks (RBs), or physical RBs (PRBs) as defined in 5G NR, which can include one or more resource elements (REs) including multiple subcarriers over the portion of time (e.g., a transmission time interval (TTI), which can be the one or more symbols, one or more slots of multiple symbols, etc.). Scheduled resources can correspond to resources over the access link between a base station 102 and UE 104, or resources over a sidelink between UEs, which can include UEs, integrated access and backhaul (IAB) nodes, or any node with a UE function, etc. In an example, sidelink resources can be allocated by the base station 102 in mode 1 operation. Moreover, in an example, UEs can use beamforming in transmitting uplink communications to a base station, receiving downlink communications from the base station, transmitting communications to and/or receiving communications from, one another, etc.

Beamforming can include selectively activating or applying power to antenna resources to achieve a spatial direction for transmitting or receiving signals. In an example, a base station can configure beamforming for the UE 104 by specifying a beamforming matrix to apply to the antenna resources to achieve the spatial direction. In an example, the base station and/or UE 104 can perform a beam training procedure to receive and measure multiple signals transmitting using a transmit beam and received using a receive beam to determine a desirable transmit/receive beam pair. An indication of the desirable transmit/receive beam pair can be indicated to the base station, and the base station can accordingly configure beams for communications with the UE 104. In another example, UEs communicating over sidelink can similarly perform beam training and/or otherwise configure beams for communicating with one another.

For example, preemption and cancellation indicators can be used in 5G NR to prioritize certain types of traffic. In access link for 5G NR, multiple priorities of traffic may be defined, which may include a lower priority traffic (e.g., eMBB access), which can be typical or normal priority access link (e.g., downlink or uplink) traffic, and a higher priority traffic (e.g., URLLC), which can be higher priority than the lower priority traffic (e.g., eMBB). Because of low latency requirement, higher priority traffic is to be transmitted as soon as possible once the data arrives at the source (e.g., the source being the base station for downlink or the UE for uplink). When DL higher priority traffic is to be transmitted by a base station, the base station can stop lower priority traffic DL transmission in overlapping resources and instead transmit DL higher priority traffic. In this example, the base station 102 can transmit downlink control information (DCI) of DCI format 2_1 as a PI to notify a group of UEs of the PRB(s) and OFDM symbol(s) where UEs may assume no transmission is intended for the UEs. Said differently, this can provide a way for the base station 102 to inform one or more UEs that they were scheduled to receive downlink communications in resources, but the base station 102 did not transmit downlink communications in those resources, because of some urgent higher priority traffic, to prevent the UEs from trying to decode signals received in its scheduled DL resources. In another example, a first UE can be scheduled to transmit uplink communications in UL resources, but a second UE may have UL higher priority traffic to transmit in overlapping resources, and the base station 102 can schedule the second UE for UL higher priority traffic in at least the overlapping resources. In this example, the base station 102 can inform the first UE, via a CI, that its UL resources are cancelled. As described herein, P/C determining component 252 can receive and process these PI/CI to preempt or cancel access link traffic. An example is shown in FIG. 5.

FIG. 5 illustrates various example systems for preempting/cancelling resources in access link communications. For example, in system 500, UE1 can be scheduled to transmit uplink communications to the gNB (e.g., base station) in a set of resources. UE4 can have UL URLLC traffic, or other higher priority traffic, to transmit to the gNB. In this example, the gNB can transmit a CI to UE1 to cancel the scheduled resources in order to allow UE4 to transmit UL URLLC traffic to gNB over the scheduled resources. In an example, as described further herein, UE1 may determine subsequent resources to transmit uplink communications to the gNB (e.g., a next uplink transmit opportunity) based on the CI (e.g., via implicit or explicit indication in the CI). For example, in system 502, UE1 can be scheduled to receive downlink communications from the gNB in a set of resources. The gNB can determine that it has DL URLLC traffic, or other higher priority traffic, to transmit to UE4. In this example, the gNB can transmit a PI to UE1 to cancel the scheduled resources in order to allow for transmitting the DL URLLC traffic to UE4 over the scheduled resources. In an example, as described further herein, UE1 may determine subsequent resources to receive downlink communications from the gNB (e.g., a next uplink transmit opportunity) based on the PI (e.g., via implicit or explicit indication in the PI). Moreover, for example, similar PI/CI can be used to preempt or cancel sidelink traffic.

FIG. 6 illustrates various example systems for preempting/cancelling resources in the context of sidelink communications. For example, for sidelink traffic, UL URLLC (or other high priority) traffic may arrive at the UE 104 and may need to be transmitted in resources that were originally scheduled for sidelink traffic (e.g., UL high priority preempting/cancelling SL). In system 600, UE1, UE2, UE3, and UE4 can communicate in a sidelink network. In this specific example, UE4 can be scheduled to transmit UL URLLC to gNB and while UE1 is scheduled to transmit SL communications (e.g., to UE2 or generally to multiple UEs) in overlapping resources that overlap in time and/or in frequency. In this example, the gNB may determine to transmit a CI to UE1 if it determines that UE1 SL communications may interfere with UE4 UL URLLC communications to the gNB, and/or may transmit a PI to UE2 if it determines that UE2 receiving the SL communications from UE1 may be interfered by UE4 UL URLLC transmission. In another example, however, gNB may determine that the SL communications of UE1 and UL URLLC transmission of UE4 do not interfere and may not send a PI/CI. In an example, gNB may determine that the communications do not interfere based on one or more of a level of interference between UE1 and UE4, which may be determined from an interference graph, a distance between UE1 and UE4, beams used by UE1 or UE4 in transmitting respective communications, or other parameters.

In another example, for sidelink traffic, sidelink URLLC (or other high priority) traffic may arrive at the UE 104 and may need to be transmitted in resources that were originally scheduled for UL (e.g., sidelink high priority cancelling UL transmission). In system 602, UE1, UE2, UE3, and UE4 can communicate in a sidelink network. In this specific example, UE4 can be scheduled to transmit UL communications to gNB (e.g., a base station) and while UE1 is scheduled to transmit SL URLLC communications (e.g., to UE2 or generally to multiple UEs) in overlapping resources that overlap in time and/or in frequency. In this example, the gNB may determine to transmit a CI to UE4 to cancel the UL transmission over corresponding resources if it determines that UE4 UL communications may interfere with UE1 SL URLLC communications. In another example, however, gNB may determine that the UL communications of UE4 and SL URLLC transmission of UE1 do not interfere (e.g., based on an interference graph, a distance between UE1 and UE4, beams used by UE1 or UE4 in transmitting respective communications, beams used by other UEs to receive the SL communications from UE1, or other parameters) and may not send a CI to UE4.

In another example, for sidelink traffic, sidelink URLLC (or other high priority) traffic may arrive at the UE 104 and may need to be transmitted in resources that were originally scheduled for normal sidelink (e.g., sidelink high priority preempting normal sidelink). In system 604, UE1, UE2, UE3, and UE4 can communicate in a sidelink network. In this specific example, UE4 can be scheduled to transmit SL communications to UE3 (and/or other UEs) while UE1 is scheduled to transmit SL URLLC communications (e.g., to UE2 or generally to multiple UEs) in overlapping resources that overlap in time and/or in frequency. In this example, the gNB may determine to transmit a CI to UE4 to cancel the SL transmission or corresponding resources if it determines that UE4 SL communications may interfere with UE1 SL URLLC communications. In another example, however, gNB may determine that the SL communications of UE4 and SL URLLC transmission of UE1 do not interfere (e.g., based on an interference graph, a distance between UE1 and UE4, beams used by UE1 or UE4 in transmitting respective communications, beams used by other UEs to receive the SL communications from UE1, or other parameters) and may not send a CI to UE4.

In any case, in the above examples or other scenarios, it is possible for a UE 104 to receive at least one of a PI or CI from the base station 102, where PI can generally relate to preempting scheduled resources that were scheduled for receiving communications and CI can generally relate to cancelling scheduled resources that were scheduled for transmitting communications. In method 400, at Block 404, subsequent resources over which to receive or transmit the communications can be determined based at least in part on the indication. In an aspect, resource determining component 254, e.g., in conjunction with processor(s) 212, memory 216, transceiver 202, communicating component 242, etc., can determine, based at least in part on the indication, the subsequent resources over which to receive or transmit the communications. For example, the subsequent resources can similarly include time and/or frequency resources over which the UE 104 can transmit or receive the communications based on the preemption or cancellation of previously scheduled resources. In an example, the indication can be an explicit or implicit indicator of the subsequent resources or otherwise an indicator to determine the subsequent resources. For example, where the initial resource grant that schedules the previously scheduled resources is for present and future resources, the PI/CI can indicate preemption or cancellation of the present resources and/or can increase future resources.

In one example, in determining the subsequent resources at Block 404, optionally at Block 406, the subsequent resources can be selected from one or more resources indicated in a configuration. In an aspect, resource determining component 254, e.g., in conjunction with processor(s) 212, memory 216, transceiver 202, communicating component 242, etc., can select the subsequent resources from the one or more resources indicated in the configuration. For example, there may be a periodic time and/or frequency resource that a UE 104 can use to receive or transmit communications that were originally to be received over preempted resources or transmitted over cancelled resources. In one example, the periodic resources can be indicated in a configuration to the UE 104 or otherwise determined by the UE 104 based on the indication. In an example, a base station 102 can configure, to the UE 104, an indication of the periodic resources or an indication of parameters to use to determine the periodic resources (e.g., in a radio resource control (RRC) configuration, downlink control information (DCI), etc.). Based on receiving the indication, in this example, resource determining component 254 can accordingly implicitly determine the periodic resources as the subsequent resources over which to receive or transmit the communications. For example, resource determining component 254 can determine a next instance of the periodic resources, based on a previous instance of the periodic resources and period information that may be indicated in the configuration.

In one example, in determining the subsequent resources at Block 404, optionally at Block 408, a subsequent time resource can be determined based on a time resource corresponding to the scheduled resources. In an aspect, resource determining component 254, e.g., in conjunction with processor(s) 212, memory 216, transceiver 202, communicating component 242, etc., can determine the subsequent time resource based on the time resource corresponding to the scheduled resource, and can determine the subsequent resources as including the subsequent time resource. In an example, resource determining component 254 can determine the subsequent time resource as an offset from the time resource of the originally scheduled resources. For example, the indication received in Block 402 may implicitly update scheduled resource to the same symbol/PRB in a next slot or a slot that is a configured number of slots (e.g., k slots) from the current slot, etc. For example, where the UE 104 was scheduled to transmit UL communications in slot 0, symbol 0, PRB 0, but received an indication to cancel these resources, resource determining component 254 can determine, based on the indication, the subsequent resources in slot k, symbol 0, PRB 0 to transmit the UL communications instead. Thus, for example, the base station 102 and UE 104 can know that if communications for the UE 104 get cancelled/preempted, there is another transmission or reception opportunity corresponding to the one that got cancelled/preempted. In an example, k can be configured by the base station (e.g., in RRC signaling, system information broadcast signaling, etc.), determined as defined for a wireless communication technology (e.g., 5G NR), and/or the like. In addition, in the examples described in connection with Blocks 406 and 408 above (or more generally for Block 404), resource determining component 254 may determine the subsequent resources to be of the same frequency of the originally scheduled resources, or may similarly determine a frequency offset for the subsequent resources where the offset can be configured by the base station or otherwise determined, etc.

In one example, in determining the subsequent resources at Block 404, optionally at Block 410, the subsequent resources can be determined from the indication. In an aspect, resource determining component 254, e.g., in conjunction with processor(s) 212, memory 216, transceiver 202, communicating component 242, etc., can determine the subsequent resources from the indication. For example, the indication may explicitly specify the subsequent resources for receiving communications (e.g., where the indication is a preemption indication) or subsequent resources for transmitting communications (e.g., where the indication is a cancellation indication). In an example, the indication may specify the explicit frequency or time resources for the subsequent resources, may indicate the frequency or time resources as one or more offsets (e.g., in frequency or time)

from the originally scheduled resources, etc. For example, at least one of PI or CI can include information on the next receive or transmit opportunity for the current preempted or cancelled one. In any case, in this example, resource determining component 254 can determine the subsequent resources as specified in the indication received at Block 402.

In method 400, at Block 412, the communications can be received or transmitted in the subsequent resources. In an aspect, communicating component 242, e.g., in conjunction with processor(s) 212, memory 216, transceiver 202, etc., can receive or transmit the communications in the subsequent resources. In one example, communicating component 242 can receive communications in the subsequent resources, which can include receiving downlink communications from the base station 102 or sidelink communications from another UE, where the scheduled resources were preempted. In another example, communicating component 242 can transmit communications in the subsequent resources, which can include transmitting uplink communications to the base station 102 or sidelink communications to one or more other UEs, where the scheduled resources were cancelled.

In method 400, at Block 414, preemption or cancellation of a second stage of sidelink communications can be determined based at least in part on the indication. In an aspect, resource determining component 254, e.g., in conjunction with processor(s) 212, memory 216, transceiver 202, communicating component 242, etc., can determine, based at least in part on the indication, preemption or cancellation of a second stage of sidelink communications. For example, sidelink communications may support multiple stages of control signaling. In an example, sidelink control signaling may include first stage sidelink control information (SCI-1) transmitted on PSCCH, which can include information for resource allocation and decoding second stage control, as well as second stage sidelink control information (SCI-2) transmitted on PSSCH, which can include information for decoding data (SCH). For example, SCI-1 may be decodable by UEs in multiple releases of a wireless communication technology (e.g., in current releases of 5G NR), whereas new SCI-2 formats can be introduced in future releases of the wireless communication technology. This can ensure that new features can be introduced in SCI-2 while maintaining resource reservation backwards compatibility in SCI-1. In any case, in an example, where the scheduled resources relate to sidelink control signaling, determining preemption or cancellation of a first set of resources related to a first stage of sidelink control signaling may also imply preemption or cancellation of other stages of sidelink control signaling.

In this example, determining subsequent resources at Block 404 may also include determining subsequent resources for the second stage of sidelink communications, and in method 400, optionally at Block 416, the second stage of sidelink communications can be received or transmitted in additional subsequent resources. In an aspect, communicating component 242, e.g., in conjunction with processor(s) 212, memory 216, transceiver 202, etc., can receive or transmit the second stage of sidelink communications in the additional subsequent resources. In an example, resource determining component 254 can similarly determine the additional subsequent resources based on the indication (e.g., as an implicit or explicit indication of resources for the additional subsequent resources, as described above in Block 404), or an implicit determination based on the determination of the subsequent resources for the first stage of sidelink communications at Block 404 (e.g., as an offset from the subsequent resources, which may be indicated or assumed the same as a previous offset between the originally scheduled resources for the first and second stages of sidelink communications).

In method 400, optionally at Block 418, the scheduled resources can be determined from a pool of resources configured by a base station for sidelink communications. In an aspect, communicating component 242, e.g., in conjunction with processor(s) 212, memory 216, transceiver 202, etc., can select the scheduled resources from the pool of resources configured by the base station for sidelink communications, or can receive an indication from another UE of sidelink resources selected from the pool of resources. For example, the pool of resources may relate to mode 2 operation for sidelink communications, where a transmitting UE can select resources from a pool allocated by a gNB and can schedule sidelink (SL) activities in the selected resources without requiring scheduling from the gNB. Similarly, in this example, P/C determining component 252 can receive an indication from the base station 102 of preempted or cancelled scheduled resources, though the base station 102 may not have scheduled the resources.

In addition, in an example, resource determining component 254 can similarly determine the subsequent resources based on the indication (e.g., as indicated in the indication, or as an implicit assumption regarding some future resources in the pool). For example, the base station 102 can send at least one of a PI or CI to multiple UEs in the SL network (e.g., all UEs within range of UE 104) to preempt or cancel a SL UE from receiving or transmitting in resources indicated by another UE as being for transmitting high priority SL traffic to preempt or cancel already scheduled low priority SL. The PI or CI may indicate to SL UEs that whatever receive or transmit resources that were preempted or cancelled in the requested resources can be reinstated and used in the some future time (e.g., in next slot, subframe, or other division of time, etc.). SL UEs can know what the SL schedule is in some future time (e.g., as a copy of the schedule in the requested resource), and resource determining component 254 can accordingly determine the subsequent resources for receiving or transmitting the low priority SL traffic.

FIG. 7 illustrates a flow chart of an example of a method 700 for indicating a high priority sidelink transmission. In an example, a UE 104 can perform the functions described in method 700 using one or more of the components described in FIGS. 1-2.

In method 700, at Block 702, a set of sidelink resources over which to transmit sidelink communications can be selected from a pool of resources. In an aspect, communicating component 242, e.g., in conjunction with processor(s) 212, memory 216, transceiver 202, etc., can select, from the pool of resources, the set of sidelink resources over which to transmit sidelink communications. For example, communicating component 242 can select the set of sidelink resources for transmitting high priority (e.g., URLLC) sidelink communications, and may select resources already selected by another UE to transmit normal priority sidelink communications. For example, the UEs can be operating according to mode 2 operation in sidelink communications where the base station 102 can allocate a pool of resources for sidelink communications, and the UEs can select resources over which to transmit sidelink communications. Where a UE is to transmit high priority sidelink communications, however, aspects described herein can be used to provide preemption and/or cancellation of selected resources.

In method 700, at Block 704, it can be indicated, to a base station, to transmit high priority sidelink communications over the set of sidelink resources. In an aspect, priority indicating component 256, e.g., in conjunction with processor(s) 212, memory 216, transceiver 202, communicating component 242, etc., can indicate, to the base station (e.g., base station 102), to transmit high priority sidelink communications over the set of sidelink resources. For example, priority indicating component 256 can indicate the priority transmission and/or corresponding selected resources to the base station over a control channel (e.g., PUCCH) or other signaling. This may cause the base station 102 to send preemption indications and/or cancellation indications to sidelink UEs in the sidelink network to preempt receiving sidelink communications or cancel transmitting sidelink communications over the selected resources, which can allow UE 104 to transmit high priority sidelink communications over the selected resources. In an example, as described, the preemption indications and/or cancellation indications may indicate or facilitate identification of subsequent resources for the other sidelink UEs to use in receiving or transmitting the normal priority sidelink communications.

In method 700, optionally at Block 706, the sidelink communications can be transmitted, based on indicating to the base station to transmit the high priority sidelink communications, over the set of sidelink resources. In an aspect, communicating component 242, e.g., in conjunction with processor(s) 212, memory 216, transceiver 202, etc., can transmit, based on indicating to the base station to transmit the high priority sidelink communications, the sidelink communications over the set of sidelink resources. For example, communicating component 242 can transmit the high priority sidelink communications (e.g., SL URLLC traffic) over the sidelink resources, where communications to/from other UEs can be preempted or cancelled based on the PI or CI transmitted by the base station to the other UEs.

FIG. 8 illustrates a flow chart of an example of a method 800 for indicating, for preempted or cancelled resources, subsequent resources over which to communicate. In an example, a base station 102/gNB 180 can perform the functions described in method 800 using one or more of the components described in FIGS. 1 and 3. Though aspects are described generally in terms of a base station 102 performing the functions, a gNB 180 can be the base station 102 or can otherwise be similarly configured to perform the functions described herein.

In method 800, at Block 802, a device can be scheduled with resources for receiving or transmitting communications. In an aspect, scheduling component 342, e.g., in conjunction with processor(s) 312, memory 316, transceiver 302, etc., can schedule the device (e.g., a UE 104) with resources for receiving or transmitting communications. For example, scheduling component 342 can schedule the device with uplink resources for transmitting uplink communications to the base station 102, downlink resources for receiving downlink communications from the base station 102, sidelink resources for transmitting sidelink communications to, or receiving sidelink communications from, one or more other UEs (e.g., in mode 1 operation), etc., as described above.

In method 800, at Block 804, it can be determined to preempt the resources for receiving communications or to cancel the resources for transmitting communications. In an aspect, preempting/cancelling component 352, e.g., in conjunction with processor(s) 312, memory 316, transceiver 302, scheduling component 342, etc., can determine to preempt the resources for receiving communications or to cancel the resources for transmitting communications. As described, in various examples above, preempting/cancelling component 352 can determine to preempt downlink resources, originally scheduled for the device, to allow transmitting high priority downlink communications to another device over the resources, and/or can determine to cancel uplink resources, originally scheduled for the device, to allow transmitting high priority uplink communications by another device over the resources. In another example, as described above, preempting/cancelling component 352 can determine to preempt sidelink resources, originally scheduled for the device, to allow transmitting high priority uplink communications by another device over the resources, and/or can determine to preempt uplink resources, originally scheduled for the device, to allow transmitting or receiving high priority sidelink communications by another device over the resources. In another example, as described above, preempting/cancelling component 352 can determine to preempt sidelink resources, originally scheduled for the device, to allow transmitting high priority sidelink communications by another device over the resources.

In method 800, at Block 806, an indication to preempt receiving communications or to cancel transmitting communications over the resources can be transmitted based on determining to preempt or cancel the resources. In an aspect, preempting/cancelling component 352, e.g., in conjunction with processor(s) 312, memory 316, transceiver 302, scheduling component 342, etc., can transmit, based on determining to preempt or cancel the resources, the indication to preempt receiving communications or to cancel transmitting communications over the resources. For example, preempting/cancelling component 352 can transmit the indication using one or more of multiple possible signaling mechanisms, such as in DCI (e.g., based on a certain DCI format), as described above. In addition, in an example, the indication may also specify subsequent resources for the device to use for receiving or transmitting communications, as the originally scheduled resources are being preempted/cancelled. For example, the indication may specify a specific time and/or frequency resource (e.g., a PRB, symbol, slot, etc.) for subsequent receiving or transmitting of the communications.

In another example, the indication may specify parameters from which a specific time and/or frequency resource can be determined (e.g., an offset in time and/or frequency from the originally scheduled resources, etc.). In yet another example, where the preemption/cancellation relates to a first stage of multiple stages of sidelink communications, the indication may also indicate additional subsequent resources that can be used for the other stage(s) of sidelink communications, as described. Moreover, in an example, preempting/cancelling component 352 can leverage a sidelink transmitting device to transmit the PI or CI to other sidelink devices (e.g., preempting/cancelling component 352 can transmit the PI or CI to the sidelink transmitting device, and the sidelink transmitting device can transmit the PI or CI to other sidelink devices in the sidelink network over PSCCH).

In method 800, optionally at Block 808, a second indication specifying transmission of high priority sidelink communications over the resources can be received from a second device. In an aspect, preempting/cancelling component 352, e.g., in conjunction with processor(s) 312, memory 316, transceiver 302, scheduling component 342, etc., can receive, from the second device, the second indication specifying transmission of high priority sidelink communications over the resources. This may occur, for example, in mode 2 operation for sidelink communications where UEs select resources for a pool of resource allocated by the base station 102 for transmitting and/or receiving sidelink communications (and thus the resources scheduled at Block 802 may include the pool of resources). In this example, the second device can select the resources from the pool of resources for transmitting the high priority sidelink communications and may indicate the selected resources to the base station 102 (e.g., as described in reference to method 700 above). In this example, preempting/cancelling component 352 can determine to preempt or cancel the selected resources, as described, to allow the second device to transmit the high priority sidelink communications. For example, preempting/cancelling component 352 can accordingly transmit a preemption indication or cancellation indication to multiple sidelink UEs in the sidelink network to preempt the selected resources for receiving sidelink communications (e.g., normal priority sidelink communications) or the cancel the selected resources for transmitting sidelink communications (e.g., normal priority sidelink communications) by or for the multiple sidelink UEs.

In this example, the second device (as a SL UE that needs to transmit higher priority SL data, such as URLLC SL data) can request the base station 102 to suspend SL activity in resource in which second device wants to use (e.g., by transmitting the second indication). Preempting/cancelling component 352, based on receiving the second indication at Block 808, can send (e.g., as described in Block 806) PI or CI to one or more UEs in the SL network, preempting or cancelling SL UEs from receiving or receiving in the requested resource. Preempting/cancelling component 352 can generate the PI or CI to indicate to SL UEs that whatever receive or transmit resources that were preempted or cancelled in the requested resource can be reinstated and used in the some future time (e.g., in next slot, subframe, or other division of time, etc.), as described.

Figure 9:
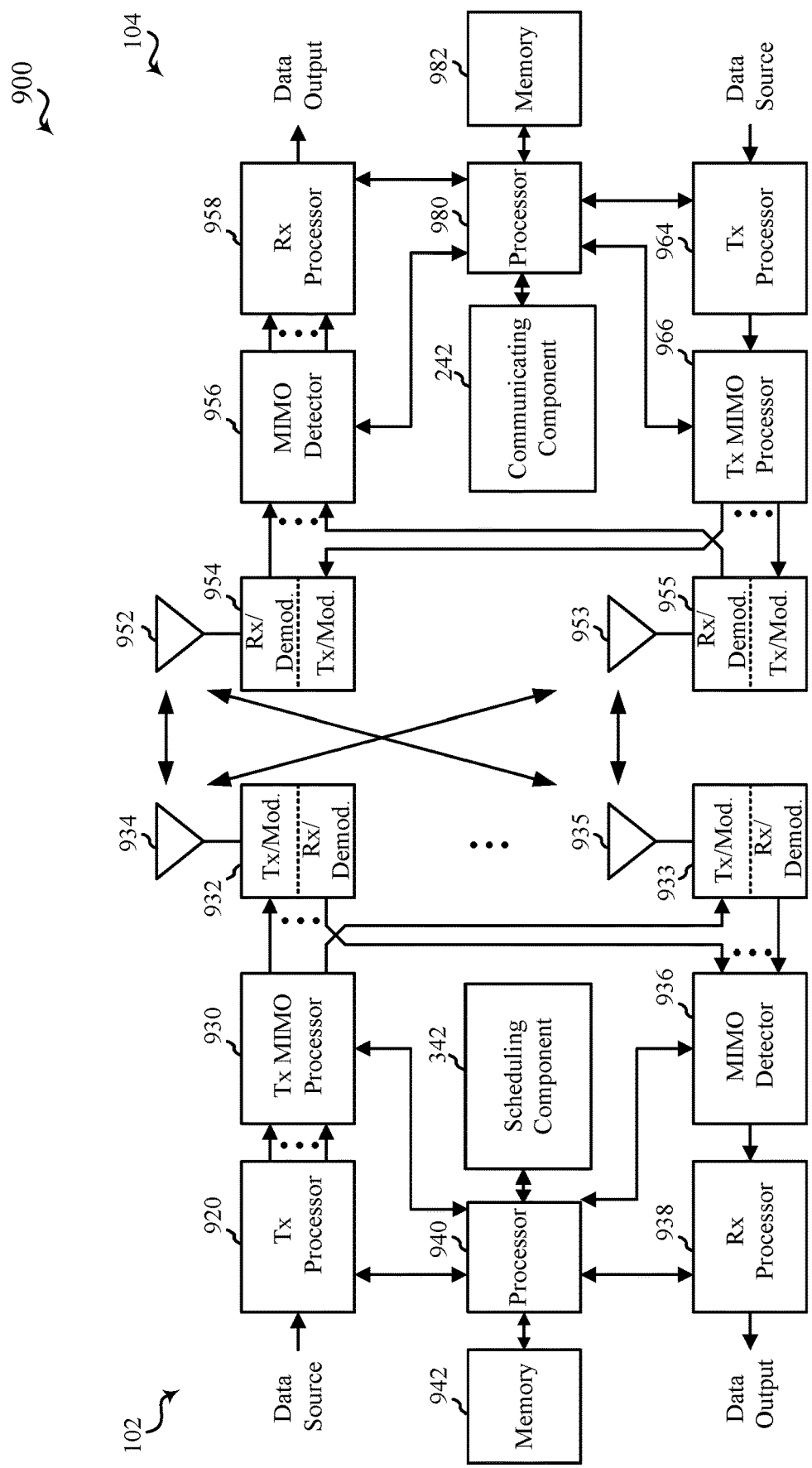
FIG. 9 is a block diagram illustrating an example of a MIMO communication system including a base station and a UE, in accordance with various aspects of the present disclosure.

FIG. 9 is a block diagram of a MIMO communication system 900 including a base station 102 and a UE 104. The MIMO communication system 900 may illustrate aspects of the wireless communication access network 90 described with reference to FIG. 1. The base station 102 may be an example of aspects of the base station 102 described with reference to FIG. 1. The base station 102 may be equipped with antennas 934 and 935, and the UE 104 may be equipped with antennas 952 and 953. In the MIMO communication system 900, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 920 may receive data from a data source. The transmit processor 920 may process the data. The transmit processor 920 may also generate control symbols or reference symbols. A transmit MIMO processor 930 may perform spatial processing (e.g., precoding) on data symbols, control symbols, or reference symbols, if applicable, and may provide output symbol streams to the transmit modulator/demodulators 932 and 933. Each modulator/demodulator 932 through 933 may process a respective output symbol stream (e.g., for OFDM, etc.) to obtain an output sample stream. Each modulator/demodulator 932 through 933 may further process (e.g., convert to analog, amplify, filter, and upconvert) the output sample stream to obtain a DL signal. In one example, DL signals from modulator/demodulators 932 and 933 may be transmitted via the antennas 934 and 935, respectively.

The UE 104 may be an example of aspects of the UEs 104 described with reference to FIGS. 1-2. At the UE 104, the UE antennas 952 and 953 may receive the DL signals from the base station 102 and may provide the received signals to the modulator/demodulators 954 and 955, respectively. Each modulator/demodulator 954 through 955 may condition (e.g., filter, amplify, downconvert, and digitize) a respective received signal to obtain input samples. Each modulator/demodulator 954 through 955 may further process the input samples (e.g., for OFDM, etc.) to obtain received symbols. A MIMO detector 956 may obtain received symbols from the modulator/demodulators 954 and 955, perform MIMO detection on the received symbols, if applicable, and provide detected symbols. A receive (Rx) processor 958 may process (e.g., demodulate, deinterleave, and decode) the detected symbols, providing decoded data for the UE 104 to a data output, and provide decoded control information to a processor 980, or memory 982.

The processor 980 may in some cases execute stored instructions to instantiate a communicating component 242 (see e.g., FIGS. 1 and 2).

On the uplink (UL), at the UE 104, a transmit processor 964 may receive and process data from a data source. The transmit processor 964 may also generate reference symbols for a reference signal. The symbols from the transmit processor 964 may be precoded by a transmit MIMO processor 966 if applicable, further processed by the modulator/demodulators 954 and 955 (e.g., for SC-FDMA, etc.), and be transmitted to the base station 102 in accordance with the communication parameters received from the base station 102. At the base station 102, the UL signals from the UE 104 may be received by the antennas 934 and 935, processed by the modulator/demodulators 932 and 933, detected by a MIMO detector 936 if applicable, and further processed by a receive processor 938. The receive processor 938 may provide decoded data to a data output and to the processor 940 or memory 942.

The processor 940 may in some cases execute stored instructions to instantiate a scheduling component 342 (see e.g., FIGS. 1 and 3).

The components of the UE 104 may, individually or collectively, be implemented with one or more application specific integrated circuits (ASICs) adapted to perform some or all of the applicable functions in hardware. Each of the noted modules may be a means for performing one or more functions related to operation of the MIMO communication system 900. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 900.

The following aspects are illustrative only and aspects thereof may be combined with aspects of other embodiments or teaching described herein, without limitation.

Aspect 1 is a method for wireless communication including receiving an indication to preempt receiving communications or cancel transmitting communications over scheduled resources, determining, based at least in part on the indication, subsequent resources over which to receive or transmit the communications, and receiving or transmitting the communications in the subsequent resources.

In Aspect 2, the method of Aspect 1 includes wherein determining the subsequent resources is based on selecting the subsequent resources from one or more resources indicated in a configuration for use when communications are preempted or cancelled.

In Aspect 3, the method of any of Aspects 1 or 2 includes wherein determining the subsequent resources is based on determining a subsequent time resource based on a time resource corresponding to the scheduled resources.

In Aspect 4, the method of Aspect 3 includes wherein determining the subsequent time resource includes determining the subsequent time resource as a preconfigured time offset from the time resource.

In Aspect 5, the method of any of Aspects 1 to 4 includes wherein determining the subsequent resources is based on an explicit identification of the subsequent resources in the indication.

In Aspect 6, the method of any of Aspects 1 to 5 includes wherein receiving the indication includes receiving, from a base station or a device, a preemption indication where the scheduled resources correspond to receiving sidelink communications, and wherein determining the subsequent resources includes determining the subsequent resources over which to receive the sidelink communications from the device.

In Aspect 7, the method of any of Aspects 1 to 6 includes wherein receiving the indication includes receiving, from a base station, a cancellation indication where the scheduled resources correspond to transmitting sidelink communications, and wherein determining the subsequent resources includes determining the subsequent resources over which to transmit the sidelink communications.

In Aspect 8, the method of any of Aspects 1 to 7 includes wherein receiving the indication includes receiving, from a base station, a preemption indication where the scheduled resources correspond to receiving downlink communications, and wherein determining the subsequent resources includes determining the subsequent resources over which to receive the downlink communications from the base station.

In Aspect 9, the method of any of Aspects 1 to 8 includes wherein receiving the indication includes receiving, from a base station, a cancellation indication where the scheduled resources correspond to transmitting uplink communications, and wherein determining the subsequent resources includes determining the subsequent resources over which to transmit the uplink communications to the base station.

In Aspect 10, the method of any of Aspects 1 to 9 includes wherein the indication relates to preemption of receiving a first stage of sidelink communications or cancellation of transmitting the first stage of sidelink communications, and further comprising determining, based on the indication, preemption of receiving a second stage of sidelink communications or cancellation of transmitting the second stage of sidelink communications.

In Aspect 11, the method of any of Aspects 1 to 10 includes wherein selecting the scheduled resources from a pool of resources configured by a base station for sidelink communications.

In Aspect 12, the method of Aspect 11 includes wherein the indication specifies a subsequent time resource of the pool of resources during which the scheduled resources are reinstated, wherein determining the subsequent resources is based on the subsequent time resource.

Aspect 13 is a method for wireless communication including selecting, from a pool of resources, a set of sidelink resources over which to transmit sidelink communications, and indicating, to a base station, to transmit high priority sidelink communications over the set of sidelink resources to cause the base station to preempt or cancel sidelink communications of other devices over the set of sidelink resource.

Aspect 14 is a method for wireless communication including scheduling a device with resources for receiving or transmitting communications, determining to preempt the resources for receiving communications or cancel the resources for transmitting communications, and transmitting, based on determining to preempt or cancel the resources, an indication to preempt receiving communications or cancel transmitting communications over the resources, wherein the indication indicates subsequent resources over which to receive or transmit the communications.

In Aspect 15, the method of Aspect 14 includes wherein determining to preempt the resources based on determining a second device transmitting high priority sidelink or uplink communications over the resources, wherein the indication includes a preemption indication where the resources correspond to receiving sidelink communications.

In Aspect 16, the method of any of Aspects 14 or 15 includes wherein determining to cancel the resources based on determining a second device transmitting high priority sidelink or uplink communications over the resources, wherein the indication includes a cancellation indication where the resources correspond to transmitting sidelink communications.

In Aspect 17, the method of any of Aspects 14 to 16 includes wherein determining to preempt the resources based on determining a second device receiving high priority downlink communications over the resources, wherein the indication includes a preemption indication where the resources correspond to receiving downlink communications.

In Aspect 18, the method of any of Aspects 14 to 17 includes wherein determining to cancel the resources based on determining a second device transmitting high priority sidelink or uplink communications over the resources, wherein the indication includes a cancellation indication where the resources correspond to transmitting uplink communications.

In Aspect 19, the method of any of Aspects 14 to 18 includes wherein the indication relates to preemption of receiving a first stage of sidelink communications or cancellation of transmitting the first stage of sidelink communications, and wherein the indication further indicates second subsequent resources over which to receive or transmit a second stage of sidelink communications.

In Aspect 20, the method of any of Aspects 14 to 19 includes wherein receiving, from a second device, a second indication specifying transmission of high priority sidelink communications over the resources, wherein the indication that indicates the subsequent resources specifies a subsequent time resource, of a pool of resources that includes the resources, during which the resources are reinstated.

Aspect 21 is an apparatus for wireless communication including a transceiver, a memory configured to store instructions, and one or more processors communicatively coupled with the memory and the transceiver, wherein the one or more processors are configured to perform one or more of the methods of any of Aspects 1 to 20.

Aspect 22 is an apparatus for wireless communication including means for performing one or more of the methods of any of Aspects 1 to 20.

Aspect 23 is a computer-readable medium including code executable by one or more processors for wireless communications, the code including code for performing one or more of the methods of any of Aspects 1 to 20.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of" A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
    a transceiver;
    a memory configured to store instructions; and
    one or more processors communicatively coupled with the memory and the transceiver, wherein the one or more processors are configured to:
        receive, from a base station or a device, a preemption indication to preempt receiving a first stage of sidelink control communications over corresponding scheduled resources;
        determine, based at least in part on the preemption indication, subsequent resources over which to receive a second stage of the sidelink control communications from the device; and
        based on the preemption indication, preempt receiving of the second stage of the sidelink control communications.

2. The apparatus of claim 1, wherein the one or more processors are configured to determine the subsequent resources based on determining a subsequent time resource based on a time resource corresponding to the corresponding scheduled resources.

3. The apparatus of claim 2, wherein the one or more processors are configured to determine the subsequent time resource at least in part by determining the subsequent time resource as a preconfigured time offset from the time resource.

4. The apparatus of claim 1, wherein the one or more processors are configured to determine the subsequent resources based on an explicit identification of the subsequent resources in the first stage of the sidelink control communications.

5. The apparatus of claim 1, wherein the one or more processors are further configured to select the corresponding scheduled resources from a pool of resources configured by a base station for sidelink communications.

6. The apparatus of claim 5, wherein the preemption indication specifies a subsequent time resource of the pool of resources during which the corresponding scheduled resources are reinstated, wherein the one or more processors are configured to determine the subsequent resources based on the subsequent time resource.

7. An apparatus for wireless communication, comprising:
a transceiver;
a memory configured to store instructions; and
one or more processors communicatively coupled with the memory and the transceiver, wherein the one or more processors are configured to:
schedule a device with corresponding resources for receiving a first stage of sidelink control communications;
determine to preempt the corresponding resources for receiving the first stage of the sidelink control communications; and
transmit, based on determining to preempt the corresponding resources, a preemption indication indicating to preempt receiving the first stage of the sidelink control communications over the corresponding resources, wherein the preemption indication facilitates determining to preempt receiving a second stage of the sidelink control communications, and wherein the preemption indication indicates subsequent resources over which to receive the second stage of the sidelink control communications.

8. The apparatus of claim 7, wherein the one or more processors are further configured to receive, from a second device, a second indication specifying transmission of high priority sidelink communications over the corresponding resources, wherein the preemption indication that indicates the subsequent resources specifies a subsequent time resource, of a pool of resources that includes the subsequent resources, during which the corresponding resources are reinstated.

9. A method for wireless communication, comprising:
receiving, from a base station or a device, a preemption indication to preempt receiving a first stage of sidelink control communications over corresponding scheduled resources;
determining, based at least in part on the preemption indication, subsequent resources over which to receive a second stage of the sidelink control communications from the device; and
based on the preemption indication, preempting receiving of the second stage of the sidelink control communications.

10. The method of claim 9, wherein determining the subsequent resources is based on determining a subsequent time resource based on a time resource corresponding to the corresponding scheduled resources.

11. The method of claim 10, wherein determining the subsequent time resource includes determining the subsequent time resource as a preconfigured time offset from the time resource.

12. The method of claim 9, wherein determining the subsequent resources is based on an explicit identification of the subsequent resources in the first stage of the sidelink control communications.

13. The method of claim 9, further comprising selecting the corresponding scheduled resources from a pool of resources configured by a base station for sidelink communications.

14. The method of claim 13, wherein the preemption indication specifies a subsequent time resource of the pool of resources during which the corresponding scheduled resources are reinstated, wherein determining the subsequent resources is based on the subsequent time resource.

15. A method for wireless communication, comprising:
scheduling a device with corresponding resources for receiving a first stage of sidelink control communications;
determining to preempt the corresponding resources for receiving the first stage of the sidelink control communications; and
transmitting, based on determining to preempt the corresponding resources, a preemption indication to preempt receiving the first stage of the sidelink control communications over the corresponding resources, wherein the preemption indication facilitates determining to preempt receiving a second stage of the sidelink control communications, and wherein the preemption indication indicates subsequent resources over which to receive the second stage of the sidelink control communications.

16. The method of claim 15, further comprising receiving, from a second device, a second indication specifying transmission of high priority sidelink communications over the corresponding resources, wherein the preemption indication that indicates the subsequent resources specifies a subsequent time resource, of a pool of resources that includes the subsequent resources, during which the corresponding resources are reinstated.

* * * * *